Sept. 16, 1947.  A. F. WELCH  2,427,584
SYNCHRONOUS MOTOR ROTOR POSITIONING DEVICE
Filed April 30, 1946
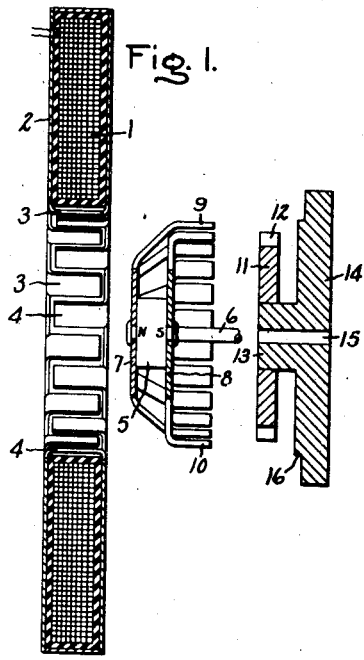
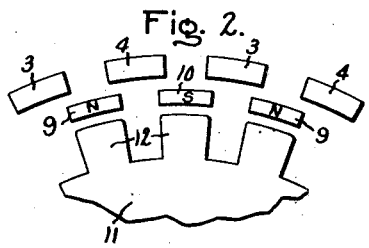
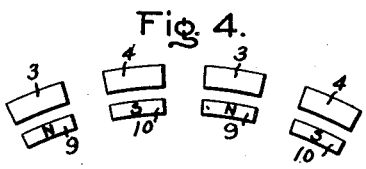
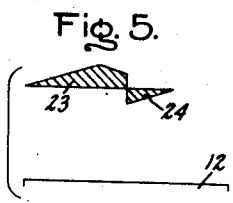
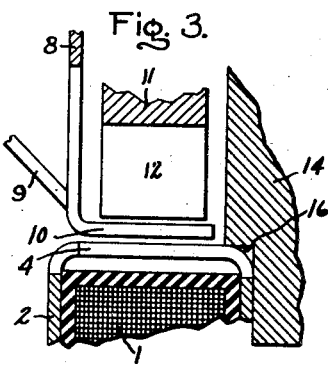
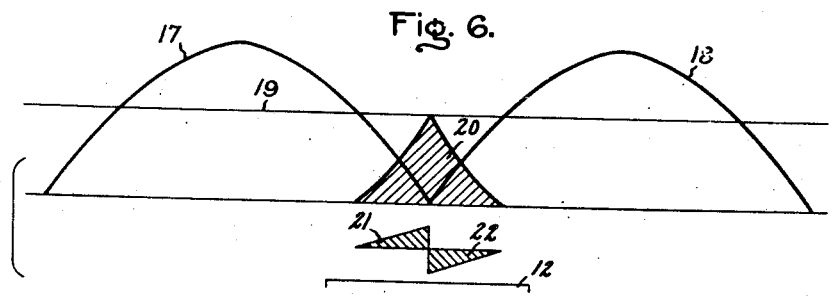
Inventor:
Alfred F. Welch,
by  Rowell S. Mack
His Attorney.

Patented Sept. 16, 1947

2,427,584

UNITED STATES PATENT OFFICE 2,427,584

SYNCHRONOUS MOTOR ROTOR POSITIONING DEVICE

Alfred F. Welch, Fort Wayne, Ind., assignor to General Electric Company, a corporation of New York Application April 30, 1946, Serial No. 665,953

5 Claims. (Cl. 172—278)

My invention relates to synchronous motors and more particularly to means for automatically positioning the rotor in a favorable starting position whenever the motor is stopped.

Single phase salient pole synchronous motors having low inertia rotors and designed with a large number of poles so as to have a fairly low synchronous speed are self-starting if the rotor is positioned in a favorable starting position relative to the stator poles when the motor is energized. However, if the rotor is not favorably positioned but stops with its rotor poles in alignment with the stator poles, it may not start. Generally speaking, motors of this type are most likely to stop with their rotors in such unfavorable starting position, and it is the primary purpose of my invention to provide means for causing the rotors of such motors to stop in the most favorable rather than the least favorable starting position.

The features of my invention which are believed to be novel and patentable will be pointed out in the claims appended hereto. For a better understanding of my invention, reference is made in the following description to the accompanying drawing in which Fig. 1 represents an exploded section side view of a motor embodying my invention. Fig. 2 represents a development of a portion of the stator and rotor poles and rotor positioning device illustrating the manner of positioning the rotor in a favorable starting position relative to the stator. Fig. 3 is a sectional detail of the assembled motor. Fig. 4 illustrates the positioning tendency of the rotor when the invention is omitted. Figs. 5 and 6 are curves explanatory of synchronous operating conditions.

In the drawing the form of motor used to illustrate the invention has a stator excited with a single phase alternating current coil 1 which is in the general shape of a washer and is incased on its exterior periphery and side walls with a shell structure 2 of magnetic material, the exact structure of which is immaterial and may have extensions for supporting the motor and its bearings, housing reduction gearing, etc. The inner peripheries of the side walls of the magnetic shell structure are provided with teeth 3 and 4, there being a number of evenly spaced teeth 3 cut from one side wall and a like number of evenly spaced teeth 4 cut from the other side wall. These teeth are bent toward and between each other at the inner periphery of the coil 1 and are interleaved to form a circular group of evenly spaced pole pieces with alternate poles extending from the opposite side walls of the stator magnetic core structure. Hence, when the coil is energized with alternating current, one group of alternate poles 3 will be of one polarity when the other group of alternate poles is of the opposite polarity, and these polarities will reverse with the alternating current reversals, producing a single phase field having equal rotating components in both directions about the circle of poles.

The rotor includes a cylindrical permanent magnet 5 which is polarized through its axis and rotatively mounted on its axis by means of a shaft 6. At opposite ends of the permanent magnet are disks 7 and 8 of magnetic steel, the peripheries of which have evenly spaced teeth cut therein of sufficient length to be bent into a common circular group of axially extending pole pieces, the teeth 9 from disk 7 being polarized by the permanent magnet 5 at one polarity and the teeth 10 from disk 8 polarized at the opposite polarity by the permanent magnet 5. The two sets of teeth are interleaved or alternate with each other and are evenly spaced, and thus, form a circle of evenly spaced salient pole pieces of alternate polarity. The number of rotor poles is made equal to the salient poles of the stator. In the example given there is assumed to be 24 poles in the stator and 24 poles in the rotor. The outer diameter of the rotor is such as to be inserted into the stator with the proper air gap between the stator and rotor pole pieces. In the example given the teeth in the two rotor disks are bent in the same axial direction, which makes the rotor resemble the shape of an umbrella and provides space inside the rotor tooth circle for the positioning device. The rotor teeth have an axial length slightly less than the axial length of the stator teeth.

The rotor positioning device comprises a stationary toothed magnetic disk 11, preferably having the same number of evenly spaced teeth 12 as the rotor, and positioned inside the rotor, when the parts are assembled, with the teeth 12 of the positioner midway between the stator teeth 3 and 4 as shown in Fig. 2. The circles of teeth in positioner, rotor, and stator are concentric and lie in the same radial plane. The air gap between the positioner 11 and rotor is not greater than and is preferably slightly less than the air gap between rotor and stator. The positioning device is made of soft iron or other magnetic material having good permeability. The positioner 11 may have a central opening which is pressed on a hub part 13 of a nonmagnetic bearing plate 14 which is drilled with a central opening 15 fitting shaft 6, and thus, serves as the bearing for the rotor. A bearing at the opposite end of the rotor is generally unnecessary. The plate 14 is also provided with a short circular section 16 dimensioned to fit snugly into the adjacent end of the stator with its periphery against the inner surfaces of the stator pole pieces 4, as shown in Fig. 3. The bearing plate 14 thus supports the rotor and the rotor positioner 11 centrally within the stator in their proper places and provides the rotor bearing.

In a motor of this character, without the positioner of my invention, the rotor usually takes a rotary position with its teeth aligned with the stator teeth, as represented in Fig. 4, when the stator is deenergized and the rotor comes to a stop. The rotor is usually connected with its load by gearing in which there is sufficient backlash to permit the rotor to move freely a half tooth pitch to establish the rotor and stator tooth alignment represented in Fig. 4. The rotor takes this position when free to do so because the rotor teeth being polarized as alternate north and south poles by the permanent magnet seek the position of least magnetic reluctance or are attracted to the stator poles, as shown in Fig. 4. Unfortunately, such position is also the most unfavorable starting position when the stator is again energized, because the rotor teeth are at a dead-center position relative to the stator teeth. For instance, if we assume the stator is energized with the rotor positioned as represented in Fig. 4, if the first half cycle at the instant of circuit closure makes stator teeth 3 south poles and teeth 4 north poles, such flux cycle will more firmly hold the rotor to the position shown by magnetic attraction. On the next half cycle poles 3 will be north and poles 4 south poles, which flux cycle will produce magnetic repelling forces on the adjacent rotor poles. However, with the rotor positioned as shown, the magnetic repelling forces are equally divided in attempting to turn the rotor in opposite directions, and the resultant rotative torque is zero. Hence, this type of motor is not self-starting although occasionally the rotor position and other conditions, such as balance and vibration, may allow the rotor to start.

When my rotor positioning device is added as shown in Fig. 2, it positions the polarized rotor in the most favorable starting position with the rotor teeth in alignment with the teeth in the positioner and midway between the stator teeth. Of course, there is still some tendency for the rotor to align with the stator teeth but the tendency to align with the positioner teeth is made greater. For one reason, the positioner 11 may be made of somewhat higher permeability material than the stator, the flux path therethrough from a north rotor pole to a south rotor pole is many times shorter than the path about the stator shell 2 between stator teeth, and finally, the air gap between rotor teeth and positioner teeth may be made less if necessary than the air gap between stator and rotor teeth. In other words, the reluctance of the path for the permanent magnet flux of the rotor is less through the positioner than through the stator. Hence, there is no difficulty in having the positioner take control of the rotor position when the stator is deenergized.

With the rotor positioned as shown in Fig. 2, it will always start and launch itself into synchronism in one direction or the other when the stator is energized. If on the first half cycle stator poles 3 are positive and poles 4 negative, the rotor will start clockwise. If on the first half cycle poles 3 are negative and poles 4 are positive, the rotor will start counterclockwise. If rotation in one direction only is desired, the gear train may include a known form of one-way stop feature to prevent rotation except in the desired direction, in which case starting in the desired direction will be delayed usually by not more than one-half cycle. The positioning of the teeth 12 between the stator teeth is not critical and, in fact, where rotation in one direction only is desired, it may be somewhat beneficial to the operation of the motor to shift the teeth 12 slightly in the direction of rotation from a position exactly midway between the stator teeth.

The positioning device does not interfere with proper synchronous motor operation, because when the stator is energized and the rotor is in synchronism, the stator poles are polarized at opposite polarity to the rotor poles nearest thereto at any instant and the rotor flux is substantially fully utilized in satisfying the magnetic requirements of this condition except when the stator flux passes through zero value in reversing, at which time the rotor poles are passing opposite the positioner poles, and any backward torque due to the presence of the positioner poles is canceled by an equal amount of forward torque for the same reason.

This may be illustrated as in Fig. 6, where the curve 17 represents the stator flux of, say, a pole 3 during one-half cycle and curve 18 represents the stator flux of the next adjacent stator pole 4 in a clockwise direction in the next half cycle. Let the line 19 represent the flux from the rotor pole of opposite magnetic polarity to fluxes 17 and 18, which passes such stator poles in phase with and in synchronous relation with such stator fluxes. Adjacent the point where the flux 17 falls to zero and the flux 18 starts to rise, the stator flux does not utilize all of the rotor flux 19 by the amount represented in the shaded triangle at 20. Hence, the rotor flux 20 is available momentarily to cooperate with the positioning pole represented at 12. A clockwise torque represented by triangle 21 will be produced as the rotor pole approaches the center of the positioning pole 12, and a counterclockwise torque represented by triangle 22 will be produced as the rotor pole moves away from the center of the positioning pole, and it is seen that the two torques 21 and 22 cancel and are furthermore small and rather insignificant.

If, however, the positioning pole 12 be shifted slightly clockwise or in the direction of rotor rotation from the position midway between stator poles assumed in Fig. 6, as represented in Fig. 5, then the rotor flux-positioning pole torques will be as represented by shaded areas 23 and 24, where the clockwise torque 23 is appreciably larger than the counterclockwise torque 24. This indicates that where the motor is to rotate in one direction of rotation only, it may be advantageous from an operating standpoint to have the positioning poles moved slightly in the direction of rotation from a position midway between the stator poles, with the most satisfactory position established by experiment for each design of motor.

The positioning device having poles completely about the inside of the rotor does not place any unbalanced radial pull thereon.

What I claim as new and desire to secure by Letters Patent of the United States is:

1. A single phase synchronous motor, comprising cooperating rotor and stator elements both of which are provided with the same number of evenly spaced salient magnetic pole pieces in cooperative relation, a single phase energizing coil on the stator member for producing an alternating flux in its pole pieces with the adjacent poles at opposite magnetic polarity, a permanent magnet for polarizing the pole pieces of the rotor member as alternate north and south poles, and a rotor positioning device comprising a toothed magnetic member having a tooth spacing corresponding to that of stator and rotor, said positioning device being stationary with its teeth in a position approximately midway between the stator teeth and sufficiently close to the rotor to attract the rotor pole pieces to such position when the rotor is free to turn and the stator is deenergized.

2. A single phase synchronous self-starting motor, comprising a stator member having a single phase energizing coil and a magnetic circuit providing an even number of evenly spaced salient pole pieces in circular formation which are magnetized at alternate polarity with an alternating flux when the coil is energized with alternating current, a rotor member having the same number of salient magnetic pole pieces as the stator in evenly spaced circular formation inside the circle of stator pole pieces and separated therefrom by a concentric air gap, permanent magnet means for polarizing the rotor pole pieces as alternate north and south poles, and a stationary rotor positioning device comprising a toothed magnetic wheel having a tooth spacing corresponding to that of stator and rotor, said device being located inside the rotor with its teeth separated from the circle of rotor teeth by a concentric air gap and with its tooth position approximately midway between the stator teeth and sufficiently close to the rotor to attract the rotor pole pieces to its tooth position when the rotor is free to turn and the stator is not energized.

3. In a single phase synchronous motor, a rotor comprising a cylindrical permanent magnet having its axis coinciding with the rotor axis of rotation and polarized along such axis, a pair of magnetic disks secured to opposite ends of such magnet, said disks having the same number of evenly spaced teeth cut into their peripheries with the outer extremities of such teeth bent in the same axial direction and with such axially extending teeth of one disk interleaved between the axially extending teeth of the other disk thereby forming a circle of evenly spaced axially extending teeth polarized alternately as north and south poles, said circle of pole pieces being axially displaced from the magnet so as to be at one end thereof, and a rotor positioning device within said circle of rotor pole pieces comprising a toothed magnetic wheel with a tooth spacing corresponding to the rotor tooth spacing and with its teeth separated from the rotor teeth by a small concentric air gap for the purpose of rotatively attracting said rotor to a desired rotary position when the rotor is otherwise free to turn.

4. A self-starting single phase synchronous motor, comprising a polarized rotor having an even number of salient pole pieces polarized as alternate north and south poles and arranged in circular formation concentric with the axis of motor rotation, a pair of stationary salient pole magnetic members each having a pole piece spacing corresponding to that of the rotor, with their pole pieces arranged in circular formation concentric with the circular formation of rotor poles and with the latter between and separating the two circular formations of stationary pole pieces, means for magnetizing one set of said stationary pole pieces with alternating fluxes with adjacent poles of opposite magnetic polarity to cause synchronous motor operation with said rotor, the other stationary salient pole magnetic member having its pole pieces positioned approximately midway between the other stationary pole pieces but shifted from such position by a small amount in a desired direction of rotor rotation and serving to magnetically position the rotor in a favorable starting position when the motor is deenergized and the rotor is free to turn.

5. A single phase synchronous motor, comprising a stator member having a single phase energizing winding and a magnetic circuit having a plurality of salient magnetic poles arranged in evenly spaced circular formation and magnetized as alternate north and south poles by alternating flux produced in such circuit when the winding is energized, a rotor having the same number of salient magnetic poles as the stator and arranged in evenly spaced circular formation in cooperative relation with the stator magnetic poles, permanent magnet means for polarizing the rotor salient pole pieces as alternate north and south poles, and a rotor positioning device having salient magnetic pole pieces adjacent the rotor which have a spacing corresponding to the spacing of the stator and rotor pole pieces, the reluctance of the path for the permanent magnet flux of the rotor being less through the positioner than through the stator, whereby the positioner controls the rotative position of the rotor when the stator is deenergized, the salient poles of the positioner having such a position relative to the stator salient poles as to move the rotor to a favorable starting position relative to the stator salient poles when the stator is deenergized and the rotor is free to turn.

ALFRED F. WELCH.